(12) United States Patent
Kawashima et al.

(10) Patent No.: US 12,263,448 B2
(45) Date of Patent: Apr. 1, 2025

(54) SEPARATION MEMBRANE MODULE AND LIQUID TREATMENT SYSTEM INCLUDING THE SAME

(71) Applicant: NITTO DENKO CORPORATION, Ibaraki (JP)

(72) Inventors: Toshiyuki Kawashima, Osaka (JP); Tomoya Ogawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 655 days.

(21) Appl. No.: 17/424,776

(22) PCT Filed: Dec. 4, 2019

(86) PCT No.: PCT/JP2019/047508
§ 371 (c)(1),
(2) Date: Jul. 21, 2021

(87) PCT Pub. No.: WO2020/153007
PCT Pub. Date: Jul. 30, 2020

(65) Prior Publication Data
US 2022/0062825 A1    Mar. 3, 2022

(30) Foreign Application Priority Data

Jan. 22, 2019  (JP) ................. 2019-008451

(51) Int. Cl.
*B01D 61/58* (2006.01)
*B01D 19/00* (2006.01)
(Continued)

(52) U.S. Cl.
CPC ......... *B01D 61/58* (2013.01); *B01D 19/0031* (2013.01); *B01D 61/08* (2013.01);
(Continued)

(58) Field of Classification Search
CPC .... B01D 61/58; B01D 19/0031; B01D 61/08; B01D 61/18; B01D 63/04; B01D 63/101;
(Continued)

(56) References Cited

U.S. PATENT DOCUMENTS 4,361,484 A * 11/1982 Larsson ............ B01J 20/28014
435/284.1
4,451,369 A * 5/1984 Sekino ................. B01D 63/043
210/336
(Continued)

FOREIGN PATENT DOCUMENTS

EP          0264696      * 4/1988
EP          264696 A    * 4/1988 .......... A61M 1/1698
(Continued)

OTHER PUBLICATIONS

Epo translation of EP0264696 (Year: 1988).*
(Continued)

*Primary Examiner* — Stephen Hobson
(74) *Attorney, Agent, or Firm* — HSML P.C.

(57) ABSTRACT

A separation membrane module 100 of the present invention includes: a container 10; a degassing membrane element 20 that is disposed inside the container 10; and a separation membrane element 60 that is disposed inside the container 10, is located upstream or downstream of the degassing membrane element 20 in a flow direction of a liquid to be treated, and filters the liquid. The separation membrane element 60 is for example, an NF membrane element or an RO membrane element.

11 Claims, 10 Drawing Sheets

(51) Int. Cl.
| | |
|---|---|
| *B01D 61/08* | (2006.01) |
| *B01D 61/18* | (2006.01) |
| *B01D 63/04* | (2006.01) |
| *B01D 63/10* | (2006.01) |
| *C02F 1/20* | (2023.01) |
| *C02F 1/44* | (2023.01) |

(52) U.S. Cl.
CPC ............ *B01D 61/18* (2013.01); *B01D 63/04* (2013.01); *B01D 63/101* (2022.08); *C02F 1/20* (2013.01); *C02F 1/44* (2013.01); *B01D 2311/04* (2013.01); *B01D 2311/06* (2013.01); *B01D 2311/2653* (2013.01); *B01D 2313/16* (2013.01); *B01D 2317/025* (2013.01); *C02F 1/441* (2013.01); *C02F 1/442* (2013.01); *C02F 1/444* (2013.01)

(58) Field of Classification Search
CPC ............ B01D 2311/04; B01D 2311/06; B01D 2311/2653; B01D 2313/16; B01D 2317/025; B01D 63/10; B01D 61/025; B01D 61/027; B01D 61/145; B01D 61/147; B01D 2317/06; B01D 2317/08; B01D 2319/06; B01D 63/02; C02F 1/20; C02F 1/44; C02F 1/441; C02F 1/442; C02F 1/444; C02F 2303/185; C02F 2103/04; C02F 2103/08; Y02A 20/131
See application file for complete search history.

(56) References Cited

U.S. PATENT DOCUMENTS

| | | | | | |
|---|---|---|---|---|---|
| 4,676,808 | A | * | 6/1987 | Coplan ................ | B01D 63/025 96/8 |
| 5,073,268 | A | * | 12/1991 | Saito .................... | C02F 1/20 210/651 |
| 5,160,042 | A | * | 11/1992 | Bikson ................. | B01D 63/025 210/321.89 |
| 5,254,143 | A | * | 10/1993 | Anazawa ............. | B01D 67/0088 96/6 |
| 5,288,308 | A | * | 2/1994 | Puri ..................... | B01D 63/04 96/10 |
| 6,120,689 | A | * | 9/2000 | Tonelli ................. | B01D 61/04 210/85 |
| 6,149,817 | A | * | 11/2000 | Peterson ............. | B01D 19/0031 210/321.78 |
| 6,267,891 | B1 | * | 7/2001 | Tonelli ................. | B01D 61/12 210/651 |
| 6,755,894 | B2 | * | 6/2004 | Bikson ................. | B01D 65/00 95/52 |
| 6,814,780 | B2 | * | 11/2004 | Bikson ................. | B01D 63/032 95/55 |
| 6,887,304 | B2 | * | 5/2005 | Stroh ................... | B01D 69/08 210/321.89 |
| 9,511,331 | B2 | * | 12/2016 | Igarashi .............. | B01D 19/0031 |
| 9,987,596 | B2 | * | 6/2018 | Pigarev ................ | B01D 69/081 |
| 2002/0195385 | A1 | * | 12/2002 | Cho ..................... | B01D 61/00 210/321.74 |
| 2003/0094610 | A1 | * | 5/2003 | Aoki .................... | H01L 21/02063 257/E21.582 |
| 2003/0111414 | A1 | * | 6/2003 | Baurmeister ........ | B01D 61/007 210/321.75 |
| 2003/0132104 | A1 | * | 7/2003 | Yamashita ........... | C02F 9/00 204/252 |
| 2005/0263458 | A1 | * | 12/2005 | Kin ...................... | C02F 9/00 210/664 |
| 2006/0081524 | A1 | * | 4/2006 | Sengupta ............ | B01D 63/0233 210/450 |
| 2006/0091077 | A1 | * | 5/2006 | Haas .................... | B01D 61/48 210/651 |
| 2006/0123753 | A1 | * | 6/2006 | Sugiura ............... | B01D 63/061 55/482 |
| 2007/0045196 | A1 | * | 3/2007 | Kawaguchi .......... | B01D 61/48 204/522 |
| 2009/0008318 | A1 | * | 1/2009 | Anes .................... | B01D 61/18 210/287 |
| 2009/0020008 | A1 | * | 1/2009 | Wynn ................... | B01D 63/046 95/45 |
| 2009/0120877 | A1 | * | 5/2009 | Pashley ................ | C02F 1/441 210/652 |
| 2011/0146491 | A1 | * | 6/2011 | Suefuji ................. | B01D 69/081 95/47 |
| 2011/0259824 | A1 | * | 10/2011 | Neubrand ............ | C02F 1/4695 210/295 |
| 2012/0070540 | A1 | * | 3/2012 | Igarashi .............. | C02F 9/00 426/67 |
| 2013/0319241 | A1 | * | 12/2013 | Solomon ............. | B01D 19/0031 96/6 |
| 2014/0216258 | A1 | * | 8/2014 | Taylor ................. | B01D 19/00 96/6 |
| 2014/0246368 | A1 | * | 9/2014 | Neubrand ............ | B01D 63/12 210/257.2 |
| 2014/0263061 | A1 | * | 9/2014 | Taylor ................. | B01D 63/04 210/321.89 |
| 2015/0053083 | A1 | * | 2/2015 | Taylor ................. | B01D 19/0031 96/6 |
| 2015/0144559 | A1 | * | 5/2015 | Taniguchi ............ | B01D 63/12 210/255 |
| 2016/0158670 | A1 | * | 6/2016 | Tanizaki .............. | B01D 63/0241 210/321.87 |
| 2017/0056788 | A1 | * | 3/2017 | Liu ...................... | B01D 15/166 |
| 2017/0259216 | A1 | * | 9/2017 | Madhavaram ....... | B01D 35/308 |
| 2017/0333850 | A1 | * | 11/2017 | Sabelfeld ............ | B01F 25/31322 |
| 2017/0348640 | A1 | * | 12/2017 | Suganuma ........... | B41J 2/19 |
| 2018/0050308 | A1 | * | 2/2018 | Lee ..................... | B01D 63/024 |
| 2018/0135006 | A1 | * | 5/2018 | Maiser ................. | C12M 37/00 |

FOREIGN PATENT DOCUMENTS

| | | | | |
|---|---|---|---|---|
| EP | 1270063 A2 | * | 1/2003 | ........ B01D 19/0031 |
| JP | 05220480 A | * | 8/1993 | |
| JP | H05220480 | | 8/1993 | |
| JP | 11342308 A | * | 12/1999 | |
| JP | H11333229 | | 12/1999 | |
| JP | H11342308 | | 12/1999 | |
| JP | 2010051933 | * | 3/2010 | |
| JP | 2010051933 A | * | 3/2010 | ........ B01D 19/0021 |
| JP | 2010201313 | | 9/2010 | |
| JP | 2013502315 | | 1/2013 | |
| JP | 2014213306 A | | 11/2014 | |
| JP | 2016022432 | | 2/2016 | |
| JP | 6834360 B2 | * | 2/2021 | ............ B01D 61/02 |
| WO | WO-2004037396 A1 | * | 5/2004 | ........... B01D 61/145 |
| WO | WO-2006125263 A1 | * | 11/2006 | ........ B01D 19/0031 |
| WO | 2011022380 | | 2/2011 | |
| WO | WO-2013174628 A1 | * | 11/2013 | ............. B01D 61/58 |
| WO | WO-2016144047 A1 | * | 9/2016 | ........... B01D 63/024 |
| WO | WO-2016209755 A1 | * | 12/2016 | ........ B01D 19/0005 |
| WO | 2017141717 | | 8/2017 | |

OTHER PUBLICATIONS

Epo translation of JP2010051933 (Year: 2010).*
Second Office Action issued for Chinese Patent Application No. 201980089613.8, dated Oct. 26, 2022, 12 pages including partial English translation.
International Search Report and Written Opinion issued for International Patent Application No. PCT/JP2019/047508, Date of mailing: Feb. 18, 2020, 14 pages including English translation.

* cited by examiner

SEPARATION MEMBRANE MODULE AND LIQUID TREATMENT SYSTEM INCLUDING THE SAME

TECHNICAL FIELD

The present invention relates to a separation membrane module and a liquid treatment system including the separation membrane module.

BACKGROUND ART

Separation membrane modules are included in systems for desalination of seawater, production of pure water, wastewater treatment, production of oil field injection water, and the like. Depending on the use of obtained water, dissolved materials such as oxygen and carbon dioxide need to be sufficiently removed from the water.

Patent Literature 1 states that dissolved oxygen is removed from water to a given dissolved oxygen level or less by degassing under reduced pressure and the remaining dissolved oxygen is then further removed by a deoxidant.

Patent Literature 2 describes a water treatment system provided with a degassing membrane between a first reverse osmosis membrane device at a first stage and a second reverse osmosis membrane device at a second stage.

CITATION LIST

Patent Literature

Patent Literature 1: JP 2016-022432 A
Patent Literature 2: WO 2017/141717 A1

SUMMARY OF INVENTION

Technical Problem

Systems including a separation membrane module are sometimes restricted in terms of the areas that the systems occupy.

The present invention aims to provide a separation membrane module that contributes to saving space for systems.

Solution to Problem

The present invention provides a separation membrane module including:
a container;
a degassing membrane element that is disposed inside the container; and
a separation membrane element that is disposed inside the container, is located upstream or downstream of the degassing membrane element in a flow direction of a liquid to be treated, and filters the liquid.

In another aspect, the present invention provides a liquid treatment system including:
a first separation membrane module that has at least one selected from an MF membrane and a UF membrane,
a second separation membrane module that is disposed downstream of the first separation membrane module in a direction of a liquid to be treated and treats a permeate liquid from the first separation membrane module, wherein
the second separation membrane module is the above separation membrane module of the present invention.

Advantageous Effects of Invention

Since the degassing membrane element and the separation membrane element are disposed inside the same container, the separation membrane module of the present invention contributes to saving space for systems. The area occupied by a system can be decreased with the use of the separation membrane module of the present invention.

DESCRIPTION OF EMBODIMENTS

Hereinafter, embodiments of the present invention will be described with reference to the drawings. The present invention is not limited to the following embodiments.

First Embodiment

Figure 1:
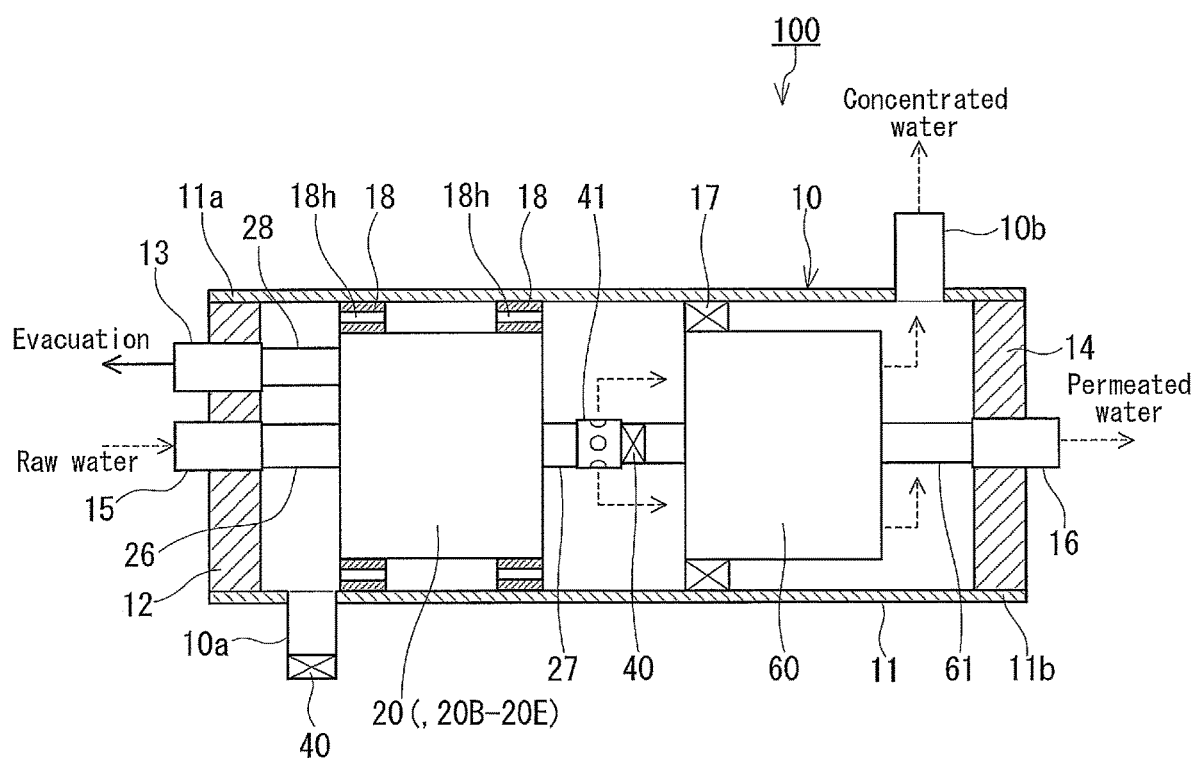
FIG. 1 is a configuration diagram of a separation membrane module according to a first embodiment of the present invention.

FIG. 1 shows a configuration of a separation membrane module 100 according to a first embodiment. The separation membrane module 100 includes a container 10, a degassing membrane element 20, and a separation membrane element 60. The degassing membrane element 20 and the separation membrane element 60 are disposed inside the container 10. The degassing membrane element 20 is located upstream of the separation membrane element 60 in a flow direction of a liquid to be treated. The degassing membrane element 20 removes a dissolved gas from the liquid. The separation membrane element 60 is located downstream of the degassing membrane element 20 in the direction of the liquid to be treated. The liquid degassed by the degassing membrane element 20 flows into the separation membrane element 60. The separation membrane element 60 produces a permeate liquid and a concentrated liquid by filtering the liquid. The separation membrane module 100 can be a hybrid module of the degassing membrane element 20 and the separation membrane element 60.

The liquid to be treated (degassed and filtered) by the separation membrane module 100 is, for example, water. For simplification, the term "water" is used herein to represent liquids. Water to be treated may be referred to as "raw water".

In the separation membrane module 100 of the present embodiment, the degassing membrane element 20 and the separation membrane element 60 are contained in the same container 10. The separation membrane module 100 is light and compact compared to a separation membrane module in which these elements are contained in different containers. Therefore, the separation membrane module 100 is suitable for a system required of weight and space savings. Moreover, the separation membrane module 100 has high maintainability too, which is demonstrated by the elements capable of being replaced individually.

In the present embodiment, the separation membrane element 60 is located downstream of the degassing membrane element 20 in the flow direction of water. This positional relationship reduces the dissolved oxygen level in water in the degassing membrane element 20 and, consequently, an anti-biofouling effect is exerted on the separation membrane element 60. This is because the growth rate of microorganisms causing biofouling depends on the dissolved oxygen level.

The container 10 has a container body 11, a first end plate 12, and a second end plate 14. The container body 11 has a cylindrical shape and is made of a material having sufficient pressure resistance. The first end plate 12 is attached to a first end portion 11a of the container body 11. The first end portion 11a of the container body 11 is closed by the first end plate 12. The second end plate 14 is attached to a second end portion 11b of the container body 11. The second end portion 11b of the container body 11 is closed by the second end plate 14.

The container body 11 has a port 10a and a port 10b. Each of the port 10a and the port 10b is a port for communication between the inside of the container 10 and the outside of the container 10. The port 10a is provided at the first end portion 11a of the container body 11. The port 10b is provided at the second end portion 11b of the container body 11. The container body 11 is bilaterally symmetric with respect to the longitudinal direction. The lateral direction of the container body 11 corresponds to the flow direction of water. This structure allows the use of a container body included in a conventional separation membrane module in the present embodiment without design changes. This contributes to reduction of an increase in the cost of the separation membrane module 100. It should be noted that in the present embodiment, a stopper 40 is attached to the port 10a to close the port 10a. The port 10a is not used in the present embodiment. The port 10a may be omitted.

In the present embodiment, the container 10 has a bilaterally asymmetric structure with respect to the flow direction of water to be treated. The bilaterally asymmetric structure is suitable for the separation membrane module 100 of the present embodiment. In the present embodiment, the container 10 has five ports, thereby achieving the bilaterally asymmetric structure.

At least one port may be provided on the first end plate 12, and at least one port may be provided on the second end plate 14. The at least one port provided on the first end plate 12 includes a port 13 for evacuating the degassing membrane element 20. The at least one port provided on the first end plate 12 further includes a port 15 for leading water to be treated to the inside of the degassing membrane element 20. The at least one port provided on the second end plate 14 includes a port 16 for leading the permeated water produced in the separation membrane element 60 to the outside of the container 10. This structure enables the degassing membrane element 20 and the separation membrane element 60 to function properly.

The number of the at least one port provided on the first end plate 12 may be different from the number of the at least one port provided on the second end plate 14. In present embodiment, the two ports 13 and 15 are provided on the first end plate 12, while only the port 16 is provided on the second end plate 14. This structure enables the degassing membrane element 20 and the separation membrane element 60 to function properly in a container body included in a conventional separation membrane module.

In the present embodiment, the port 15 is used as a raw water inlet. The port 10b is used as a concentrated water outlet. The port 13 is used as an evacuation opening. The port 16 is used as a permeated water outlet.

The ports 10a, 10b, 13, 15, and 16 each may be a simple opening portion or may be a nozzle-shaped opening portion as shown in FIG. 1.

The separation membrane module 100 further includes a support 18 disposed at a gap between the degassing membrane element 20 and the container 10. The support 18, for example, has a ring shape and surrounds the degassing membrane element 20 in the circumferential direction. The degassing membrane element 20 is fixed to the inner surface of the container 10 by the support 18. In present embodiment, two supports 18 determine the position of the degassing membrane element 20 inside the container 10.

The support 18 has a through hole 18h that allows water to pass through itself. The through hole 18h prevents formation of a closed space inside the container 10. The air escapes through the through hole 18h upon introduction of water to the inside of the container 10, and thus no closed space is formed inside the container 10. This prevents the degassing membrane element 20 from breaking due to a pressure difference. The support 18 may have only one through hole 18h or may have the plurality of through holes 18h.

The separation membrane module 100 further includes a brine seal 17 disposed at a gap between the separation membrane element 60 and the container 10. The brine seal 17, for example, has a ring shape and surrounds the separation membrane element 60 in the circumferential direction. The degassing membrane element 60 is fixed to the inner surface of the container 10 by the brine seal 17. The brine seal 17 partitions the internal space of the container 10 to prevent mixing of the raw water and concentrated water.

Figure 2:
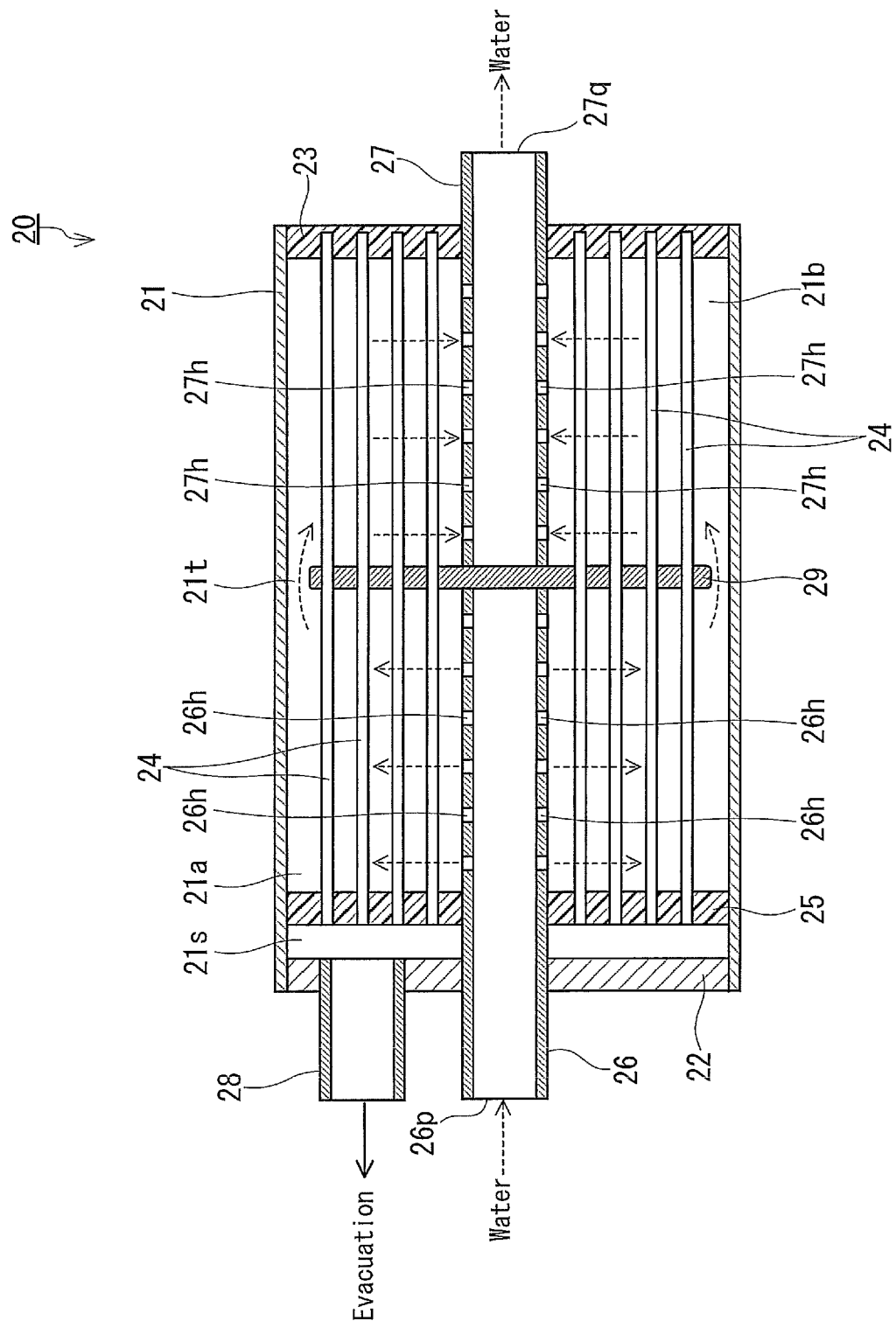
FIG. 2 is a cross-sectional view of a degassing membrane element included in the separation membrane module shown in FIG. 1.

FIG. 2 shows a cross-section of the degassing membrane element 20 included in the separation membrane module 100 shown in FIG. 1.

The degassing membrane element 20 has a shell 21, a plurality of hollow fiber membranes 24, an inlet 26p, and an outlet 27q. The plurality of hollow fiber membranes 24 are disposed inside the shell 21. Water to be gassed is introduced into the shell 21 through the inlet 26p to be brought into contact with the plurality of hollow fiber membranes 24 and is then discharged out of the shell 21 through the outlet 27q. Dissolved gases such as oxygen and carbon dioxide are removed from the water in this manner. The shell 21 has a cylindrical shape. The inlet 26p is located at one end portion of the shell 21, and the outlet 27q is located at the other end portion of the shell 21.

The degassing membrane element 20 is, for example, an externally pressurized hollow fiber membrane element. In the externally pressurized hollow fiber membrane element, water to be treated flows the outside of the hollow fiber membrane 24, and the inside of the hollow fiber membrane 24 is evacuated. An internally pressurized hollow fiber membrane element may be adopted as the degassing membrane element 20. In the internally pressurized hollow fiber membrane element, water to be treated flows the inside of the hollow fiber membrane, and the outside of the hollow fiber membrane is evacuated.

The degassing membrane element 20 further includes a first tube 26 disposed inside the shell 21. The first tube 26 extends from the inside of the shell 21 to the outside of the shell 21. The hollow fiber membranes 24 are disposed around the first tube 26. The inlet 26p of the degassing membrane element 20 is formed by one end portion of the first tube 26. The first tube 26 has a plurality of through holes 26h provided along the longitudinal direction. As shown by dotted arrows, water introduced into the first tube 26 diffuses inside the shell 21 through these through holes 26h to have contact with the hollow fiber membranes 24.

The degassing membrane element 20 further includes a second tube 27 disposed inside the shell 21. The second tube 27 extends from the inside of the shell 21 to the outside of the shell 21. The hollow fiber membranes 24 are disposed around the second tube 27. The outlet 27q of the degassing membrane element 20 is formed by one end portion of the second tube 27. The second tube 27 has a plurality of through holes 27h provided along the longitudinal direction. As shown by dotted arrows, water introduced into the shell 21 is collected into the second tube 27 through these through holes 27h and is then discharged outside of the shell 21.

In the present embodiment, the first tube 26 serves as an inlet tube and a distribution tube. The second tube 27 serves as an outlet tube and a water collection tube. The flow direction of water may be opposite from the direction shown in FIG. 2. In a second embodiment described later, the first tube 26 serves as an outlet tube and a water collection tube. The second tube 27 serves as an inlet tube and a distribution tube. The central axis of the first tube 26 may or may not correspond to the central axis of the second tube 27.

The degassing membrane element 20 further includes a baffle 29 disposed between the first tube 26 and the second tube 27 inside the shell 21. The baffle 29 has, for example, a disc shape in plan view. The other end portion of the first tube 26 and the other end portion of the second tube 27 each abut on the baffle 29 to be closed by the baffle 29. The plurality of hollow fiber membranes 24 penetrate the baffle 29. The internal space where the hollow fiber membranes 24 are disposed is partitioned by the baffle 29 into an upstream space 21a and a downstream space 21b. The first tube 26 faces the upstream space 21a. The second tube 27 faces the downstream space 21b. A gap 21t where water can flow is secured between the shell 21 and the baffle 29. Water is fed into the upstream space 21a through the first tube 26 and flows into the downstream space 21b through the gap 21.

The degassing membrane element 20 further includes a cover 22, a first cast portion 23, and a second cast portion 25. The first cast portion 23 is fitted to one end portion of the shell 21 to close the shell 21. The cover 22 and the second cast portion 25 are fitted to the other end portion of the shell 21 to close the shell 21. An evacuating space 21s is secured between the cover 22 and the second cast portion 25. The first cast portion 23 bundles portions of the plurality of hollow fiber membranes 24 at one end. The second cast portion 25 bundles portions of the plurality of hollow fiber membranes 24 at the other end. The portions of the plurality of hollow fiber membranes 24 at the one end are closed by the first cast portion 23. The portions of the plurality of hollow fiber membranes 24 at the other end extend to an end face of the second cast portion 25 and are open to the evacuating space 21s at the end face of the second cast portion 25. The first cast portion 23 and the second cast portion 25 are made of, for example, a resin filling the interspace between the adjacent hollow fiber membranes 24. The cover 22 is provided with a port 28 for evacuation so that the evacuating space 21s can be evacuated from the outside. The port 28 may be a simple opening portion or may be a nozzle-shaped opening portion.

The degassing membrane element 20 described with reference to FIG. 2 allows efficient contact between the hollow fiber membranes 24 and water and is thus suitable for the separation membrane module 100. However, the configuration of a degassing membrane element that can be included in the separation membrane module 100 is not limited to a particular one.

Figure 3:
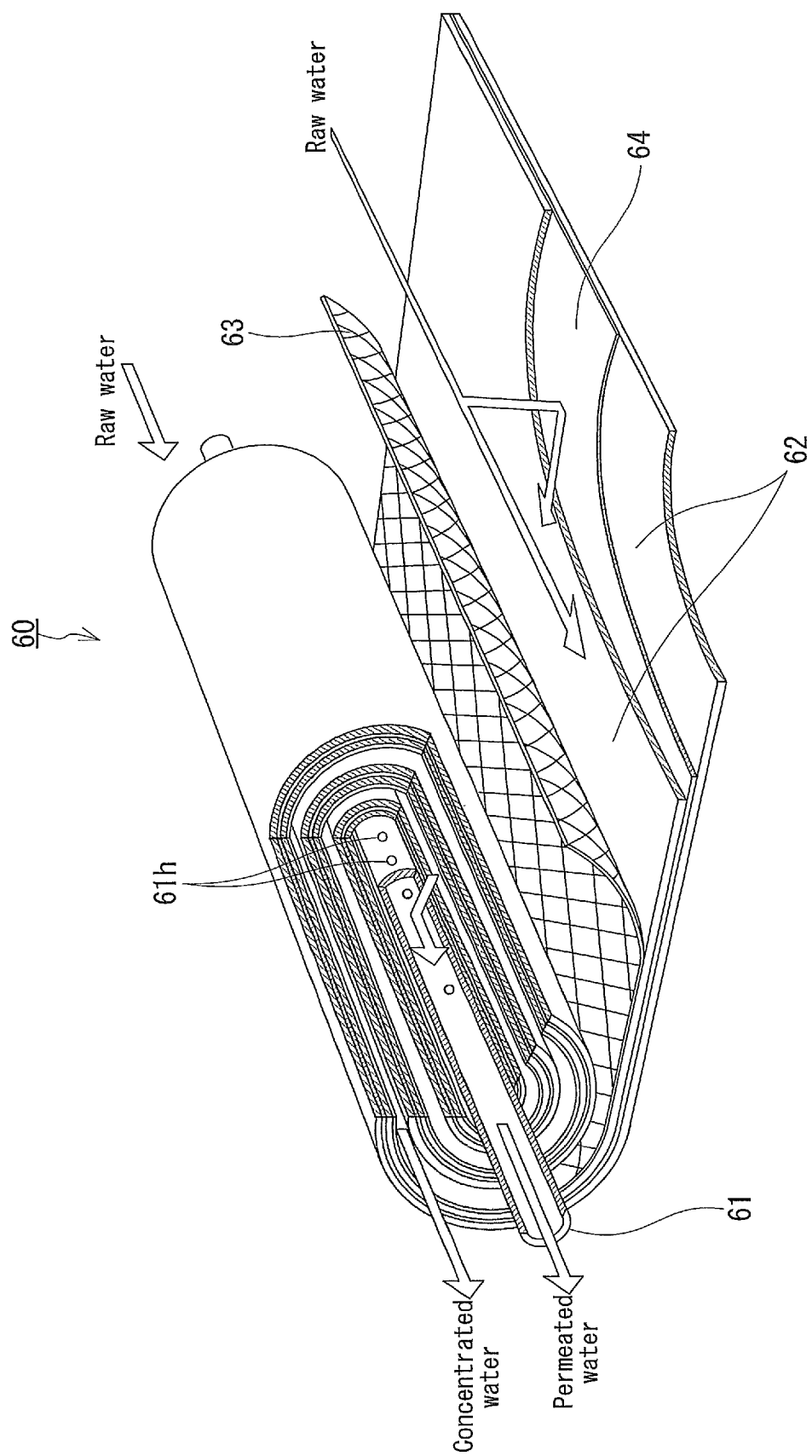
FIG. 3 is a partial development view of a separation membrane element included in the separation membrane module shown in FIG. 1.

FIG. 3 shows a partial development view of the separation membrane element 60 shown in FIG. 1. In the example shown in FIG. 3, the separation membrane element 60 is a spiral membrane element. However, the configuration of the separation membrane element 60 is not limited to a spiral type.

The separation membrane element 60 is composed of a separation membrane 62, a raw water spacer 63, and a permeated water spacer 64. Specifically, the separation membrane element 60 is composed of the plurality of separation membranes 62, the plurality of raw water spacers 63, and the plurality of permeated water spacers 64.

The plurality of separation membranes 62 are placed on each other, sealed on three sides to form a sack-like structure, and wound around the water collection tube 61. The raw water spacer 63 is disposed between the separation membranes 62 so as to be located outside the sack-like structure. The raw water spacer 63 secures space as a raw water flow path between the separation membranes 62. The permeated water spacer 64 is disposed between the separation membranes 62 so as to be located inside the sack-like structure. The permeated water spacer 64 secures space as a permeated water flow path between the separation membranes 62. An opening end of the sack-like structure is connected to the water collection tube 61 in such a manner that the permeated water flow path communicates with the water collection tube 61.

The water collection tube 61 serves to collect permeated water having permeated each separation membrane 62 and lead the permeated water to the outside of the separation membrane element 60. The water collection tube 61 is provided along its longitudinal direction with a plurality of through holes 61h at given intervals. Permeated water flows into the water collection tube 61 through these through holes 61h. Raw water flows in the raw water flow path in parallel to the longitudinal direction of the water collection tube 61.

The separation membrane element 60 includes an MF membrane, a UF membrane, an NF membrane, or an RO membrane as the separation membrane 62. An MF membrane (microfiltration membrane) is a membrane for separating fine particles and microorganisms having a size of about 0.05 to 10 μm from a liquid. A UF membrane (ultrafiltration membrane) is a membrane for separating fine particles which are too large to remove using an MF membrane and a solute having a molecular weight of about 1000 to 300000 from a liquid. An RO membrane (reverse osmosis membrane) is a membrane for separating water and a solute by moving water into a permeated water flow path by reverse osmosis. An NF membrane (nanofiltration membrane), which is a type of RO membrane, allows monovalent ions such as Na⁺ and Cl⁻ to go therethrough and rejects divalent ions such as $SO_4^{2-}$.

The separation membrane element 60 is typically an NF membrane element with an NF membrane or an RO membrane element with an RO membrane. The separation membrane element 60 may be an NF membrane module used at a relatively low operating pressure. For example, when the operating pressure is 1.5 to 2.5 MPa in the separation membrane element 60, the degassing membrane element 20 does not need a special structure for improving the pressure resistance.

The term "NF membrane" as used herein refers to a separation membrane whose NaCl rejection rate determined by filtering an aqueous NaCl solution having a concentration of 2000 mg/L at an operating pressure of 1.5 MPa and 25° C. is 5% or more and less than 93%. The term "RO membrane" as used herein refers to a separation membrane whose NaCl rejection rate determined by filtering an aqueous NaCl solution having a concentration of 2000 mg/L at an operating pressure of 1.5 MPa and 25° C. is 93% or more.

The NaCl rejection rate can be measured, for example, according to JIS K 3805 (1990). Specifically, an aqueous NaCl solution is allowed to permeate a separation membrane having a given size at an operating pressure of 1.5 MPa. After a 30-minute preliminary stage, electrical conductivity measurement is performed for permeate water and feed water using an electrical conductivity meter. From the measurement result and a calibration curve (concentration versus electrical conductivity), the NaCl rejection rate can be calculated according to the following equation. Concentration measurement may be performed by ion chromatography instead of the electrical conductivity measurement.

NaCl rejection rate (%)=(1−(NaCl concentration in permeated water/NaCl concentration in feed water))×100

As shown in FIG. 1, the port 28 of the degassing membrane element 20 is connected to the port 13. The first tube 26 of the degassing membrane element 20 is connected to the port 15. The second tube 27 of the degassing membrane element 20 is open to the internal space of the container 10. In the present embodiment, a distributor 41 is attached to an end portion of the second tube 27 in such a manner that water radially flows out of the second tube 27 into the internal space of the container 10. The stopper 40 is attached to an upstream end of the water collection tube 61 of the separation membrane element 60. The upstream end of the water collection tube 61 is closed by the stopper 40. A downstream end of the water collection tube 61 of the separation membrane element 60 is connected to the port 16.

Next, water treatment using the separation membrane module 100 will be described. In FIG. 1, the dotted lines indicate a flow of water.

By activating a vacuum pump connected to the port 13, the inside of the degassing membrane element 20, specifically the inside of the hollow fiber membrane 24, is evacuated through the evacuating space 21s.

Raw water is led to the degassing membrane element 20 through the port 15. In the degassing membrane element 20, a dissolved gas such as oxygen is removed from the raw water by contact of the raw water with the outer surface of the hollow fiber membrane 24.

The degassed raw water is discharged out of the degassing membrane element 20 and then flows into the raw water flow path of the separation membrane element 60 through the internal space of the container 10. The separation membrane element 60 produces permeated water and concentrated water by filtering the raw water. The permeated water is collected into the water collection tube 61 of the separation membrane element 60 and is then led to the outside of the separation membrane module 100 through the port 16. The concentrated water flows out of the raw water flow path of the separation membrane element 60 and is then led to the outside of the separation membrane module 100 through the internal space of the container 10 and the port 10b.

Second Embodiment

Figure 4:
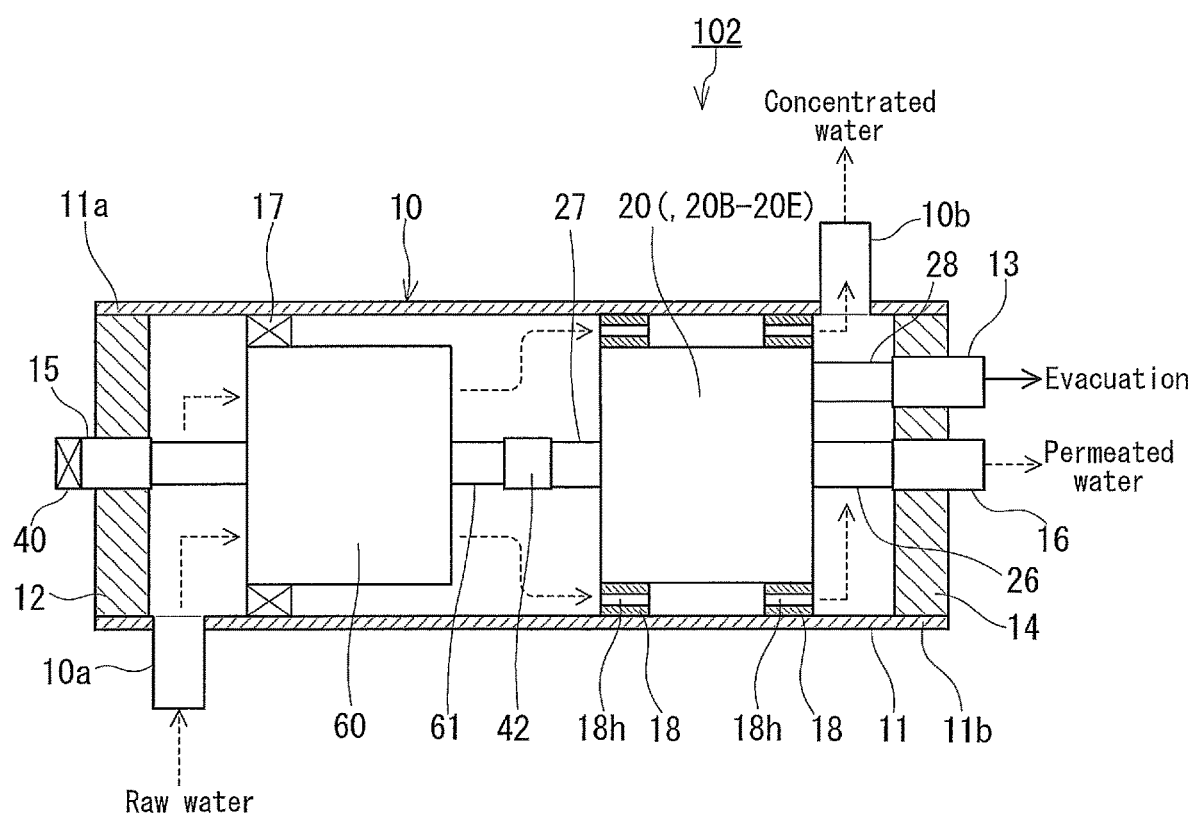
FIG. 4 is a configuration diagram of a separation membrane module according to a second embodiment of the present invention.

FIG. 4 shows a configuration of a separation membrane module 102 according to a second embodiment. The separation membrane module 100 of the first embodiment and the separation membrane module 102 of the present embodiment differ in terms of the positional relationship between the degassing membrane element 20 and the separation membrane element 60. The elements common between the separation membrane module 100 of the first embodiment and the separation membrane module 102 of the present embodiment are denoted by the same reference characters, and the description of such elements may be omitted. The description of each embodiment is applicable to other embodiments, unless there is technical inconsistency. The embodiments may be combined with each other, unless there is technical inconsistency.

In the present embodiment, the separation membrane element 60 is located upstream of the degassing membrane element 20 in the flow direction of water. Concentrated water produced in the separation membrane element 60 is discharged out of the container 10 through the outside of the degassing membrane element 20 without being degassed. Only permeated water produced in the separation membrane element 60 is introduced into the degassing membrane element 20 to be degassed. In this case, the degassing ability of the degassing membrane element 20 can be reduced. In other words, a reduction in the surface areas of the hollow fiber membranes included in the degassing membrane element 20 is allowable. This contributes to making the separation membrane module 102 light and compact.

The first end plate 12 is provided with the port 15. In the present embodiment, the stopper 40 is attached to the port 15 to close the port 15. In the present embodiment, the upstream end of the water collection tube 61 of the separation membrane element 60 is connected to the port 15, and the stopper 40 indirectly closes the water collection tube 61. The port 15 may be omitted.

The second end plate 14 is provided with the port 13 for evacuating the degassing membrane element 20. The second end plate 14 is further provided with the port 16 for leading the permeated water to the outside of the container 10. This structure enables the degassing membrane element 20 and the separation membrane element 60 to function properly.

In the present embodiment, the stopper 40 is not attached to the port 10a, and the port 10a is used as a raw water inlet. The port 10b is used as a concentrated water outlet. The port 13 is used as an evacuation opening. The port 16 is used as a permeated water outlet.

In the separation membrane module 102, the water collection tube 61 of the separation membrane element 60 communicates with the second tube 27 of the degassing membrane element 20. Specifically, a connector 42 connects the water collection tube 61 to the second tube 27. The central axis of the water collection tube 61 corresponds to the central axis of the second tube 27 of the degassing membrane element 20. This structure allows the permeated water produced in the separation membrane element 60 to be directly and smoothly introduced into the degassing membrane element 20 without going through the internal space of the container 10.

The port 28 of the degassing membrane element 20 is connected to the port 13. The first tube 26 of the degassing membrane element 20 is connected to the port 16. The second tube 27 of the degassing membrane element 20 is connected to the water collection tube 61 of the separation membrane element 60.

In the separation membrane module 102, raw water is led to the raw water flow path of the separation membrane element 60 through the port 10a and the internal space of the container 10. The separation membrane element 60 filters the raw water to produce permeated water and concentrated water. The concentrated water flows out of the raw water flow path of the separation membrane element 60 and is then led to the outside of the separation membrane module 102 through the internal space of the container 10 and the port 10b. The support 18 has the through hole 18h that allows the concentrated water to pass through itself. Thus, the concentrated water can flow through the through hole 18h in a gap between the outer periphery of the degassing membrane element 20 and the inner periphery of the container 10 to reach the port 10b.

The permeated water is collected into the water collection tube 61 of the separation membrane element 60 and flows into the second tube 27 of the degassing membrane element 20 without going through the internal space of the container 10. In the degassing membrane element 20, a dissolved gas such as oxygen is removed from the permeated water by contact of the permeated water with the outer surfaces of the hollow fiber membranes 24. The degassed permeated water is led to the outside of the separation membrane module 100 through the first tube 26 of the degassing membrane element 20 and the port 16.

Modification

Figure 5:
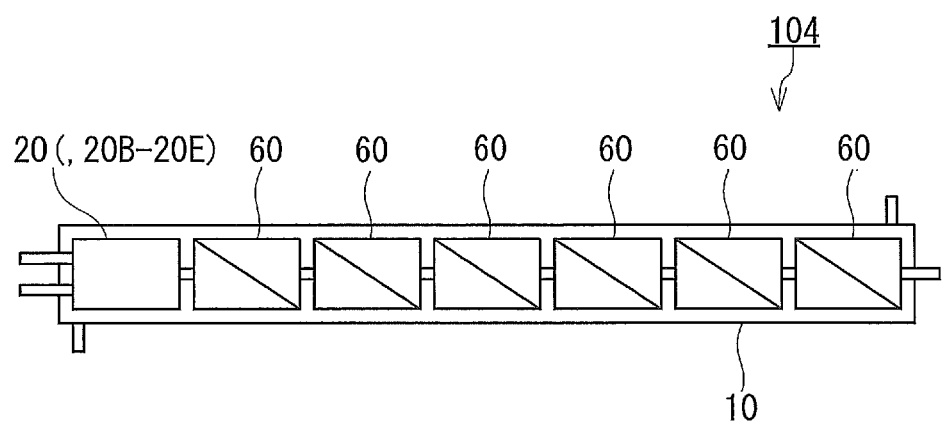
FIG. 5 is a configuration diagram of a separation membrane module according to Modification 1.
Figure 6:
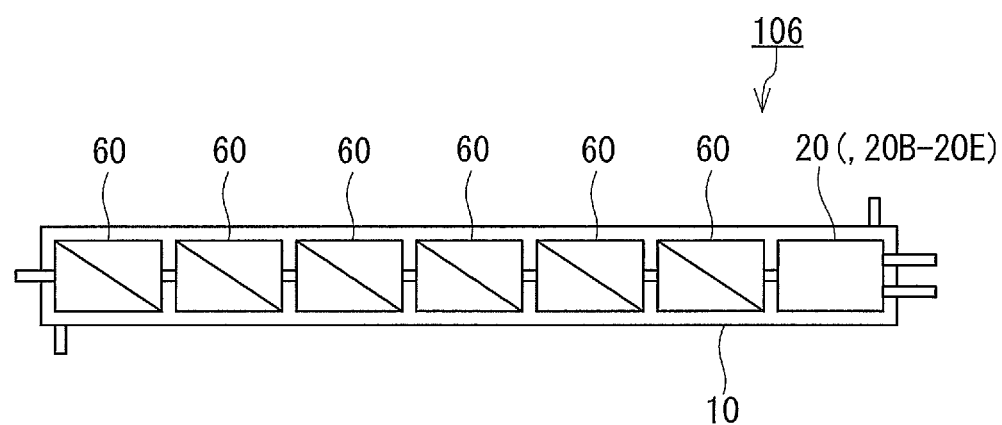
FIG. 6 is a configuration diagram of a separation membrane module according to Modification 2.

In the embodiments described with reference to FIGS. 1 and 4, there are only one degassing membrane element 20 and one separation membrane element 60 inside of the container 10. However, the number of each element is not particularly limited. FIG. 5 shows a configuration of a separation membrane module 104 according to Modification 1. FIG. 6 shows a configuration of a separation membrane module 106 according to Modification 2.

As shown in FIG. 5, the separation membrane module 104 includes the degassing membrane element 20 and the plurality of separation membrane elements 60. In the present modification, the degassing membrane element 20 is disposed most upstream in the flow direction of water inside the container 10. The plurality of separation membrane elements 60 are disposed downstream of the degassing membrane element 20 and connected to each other in series.

As shown in FIG. 6, the separation membrane module 106 includes the degassing membrane element 20 and the plurality of separation membrane elements 60. In the present modification, the degassing membrane element 20 is disposed most downstream in the flow direction of water inside the container 10. The plurality of separation membrane elements 60 are disposed upstream of the degassing membrane element 20 and connected to each other in series.

The plurality of degassing membrane elements 20 may be disposed inside the container 10. At least one degassing membrane element 20 and at least one separation membrane element 60 may be disposed inside the container 10.

A separation membrane module of a water treatment system includes, for example, six or seven separation membrane elements disposed inside a long cylindrical container. The use of a separation membrane element having a large membrane area can reduce the number of separation membrane elements without drastic reduction of the water treatment capability, making it possible to secure space for the degassing membrane element 20. That is, the structure of the separation membrane module 100 of the embodiment is suitable for a combination of a degassing membrane element and a plurality of separation membrane elements having a large membrane area.

When a spiral membrane element having a diameter of eight inches and a length of 40 inches has a membrane area of 440 ft$^2$ or larger, it can be said that the spiral membrane element has a large membrane area. The upper limit of the membrane area is, for example, but not particularly limited to, 600 ft$^2$.

Figure 7:
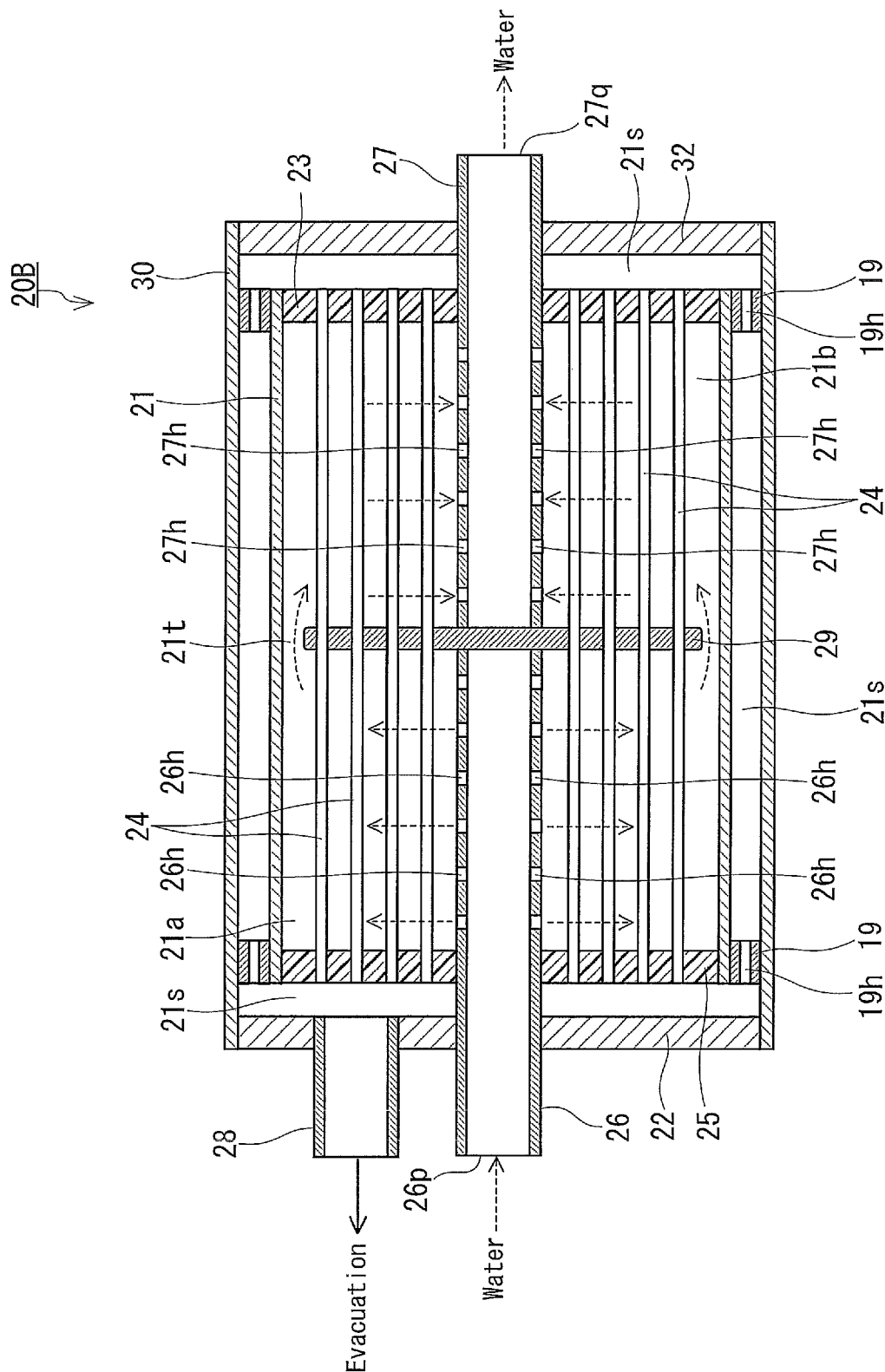
FIG. 7 is a cross-sectional view of a degassing membrane element according to Modification 3.

FIG. 7 shows a cross-section of a degassing membrane element 20B according to Modification 3. The degassing membrane element 20B shown in FIG. 7 may be included in the separation membrane modules instead of the degassing membrane element 20 shown in FIG. 2.

The degassing membrane element 20B shown in FIG. 7 further includes an outer shell 30, a cover 32, and a support 19 in addition to the configuration of the degassing membrane element 20 shown in FIG. 2. The outer shell 30 has a cylindrical shape and accommodates the shell 21 (hereinafter referred to as "inner shell"). The evacuating space 21s surrounding the inner shell 21 is secured between the inner shell 21 and the outer shell 30. Both ends of the outer shell 30 are closed by the cover 22 and the cover 32. The second tube 27 penetrates the cover 32 and extends to the outside of the degassing membrane element 20B. In the present modification, the evacuating space 21s includes not only the space between the cover 22 and the second cast portion 25 but also a space between the cover 32 and the first cast portion 23 and the space between the outer periphery of the inner shell 21 and the inner periphery of the outer shell 30.

The support 19 is disposed between the inner shell 21 and the outer shell 30. The support 19, for example, has a ring shape and surrounds the inner shell 21 in the circumferential direction. The inner shell 21 is fixed to the inner surface of the outer shell 30 by the support 19. In the present modification, two supports 19 determine the position of the inner shell 21 inside the outer shell 30. There may be only one support 19.

The portions of the plurality of hollow fiber membranes 24 at the other end extend to an end face of the first cast portion 23 and are open to the evacuating space 21s at the end face of the first cast portion 23. The support 19 has a through hole 19h that allows air to pass through itself. The space between the cover 22 and the second cast portion 25, the space between the cover 32 and the first cast portion 23, and the space between the outer periphery of the inner shell 21 and the inner periphery of the outer shell 30 communicate with each other through the through hole 19h of the support 19 to form the evacuating space 21s. This structure allows efficient evacuation because the hollow fiber membranes 24 are evacuated through the both ends of each hollow fiber membrane 24.

Figure 8:
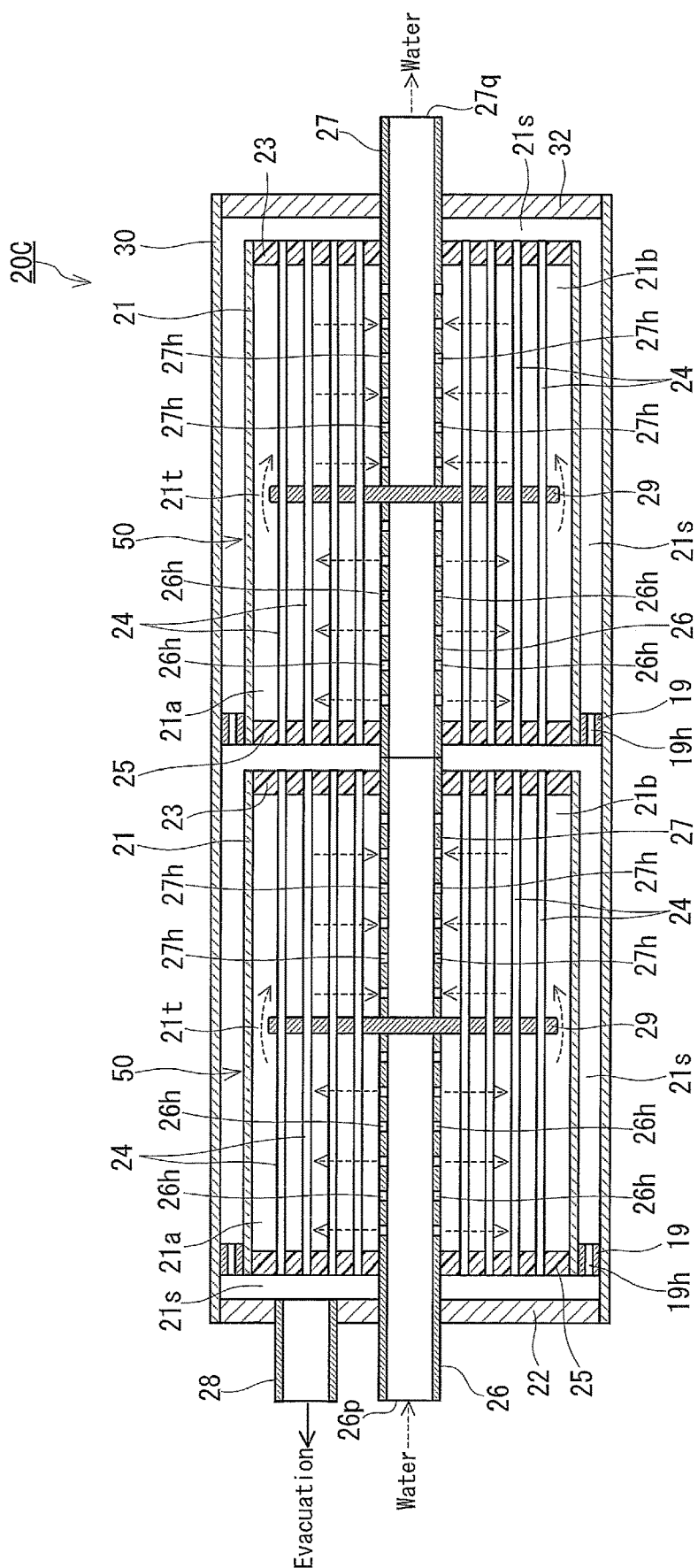
FIG. 8 is a cross-sectional view of a degassing membrane element according to Modification 4.

FIG. 8 shows a cross-section of a degassing membrane element 20C according to Modification 4. The degassing membrane element 20C shown in FIG. 8 may be included in the separation membrane modules instead of the degassing membrane element 20 shown in FIG. 2.

The degassing membrane element 20C of the present modification can be composed of the plurality of degassing membrane elements 20B (FIG. 7) connected in series. The degassing membrane element 20C is composed of, for example, two degassing membrane elements 20B connected in series. The separation membrane modules may include the plurality of degassing membrane elements connected in series.

Specifically, the degassing membrane element 20C includes a plurality of (two) hollow fiber membrane units 50 disposed inside the outer shell 30. The hollow fiber membrane unit 50 is composed of the inner shell 21, the plurality of hollow fiber membranes 24, the first tube 26, the second tube 27, the first cast portion 23, the second cast portion 25, the baffle 29, and the support 19. The second tube 27 of the hollow fiber membrane unit 50 located upstream and the first tube 26 of the hollow fiber membrane unit 50 located downstream are connected to each other. Thus, water degassed by the hollow fiber membrane unit 50 located upstream flows into the hollow fiber membrane unit 50 located downstream to be degassed further. The second tube 27 of the hollow fiber membrane unit 50 located upstream and the first tube 26 of the hollow fiber membrane unit 50 located downstream may be composed of a single seamless tube. The evacuating space 21s is configured to surround the hollow fiber membrane unit 50 located upstream and the hollow fiber membrane unit 50 located downstream, and communicates with the port 28 for evacuation through the through holes of the supports 19. In the present modification, the surface area of the hollow fiber membrane 24 can be increased, and thus the dissolved gas level can be more sufficiently decreased.

Figure 9:
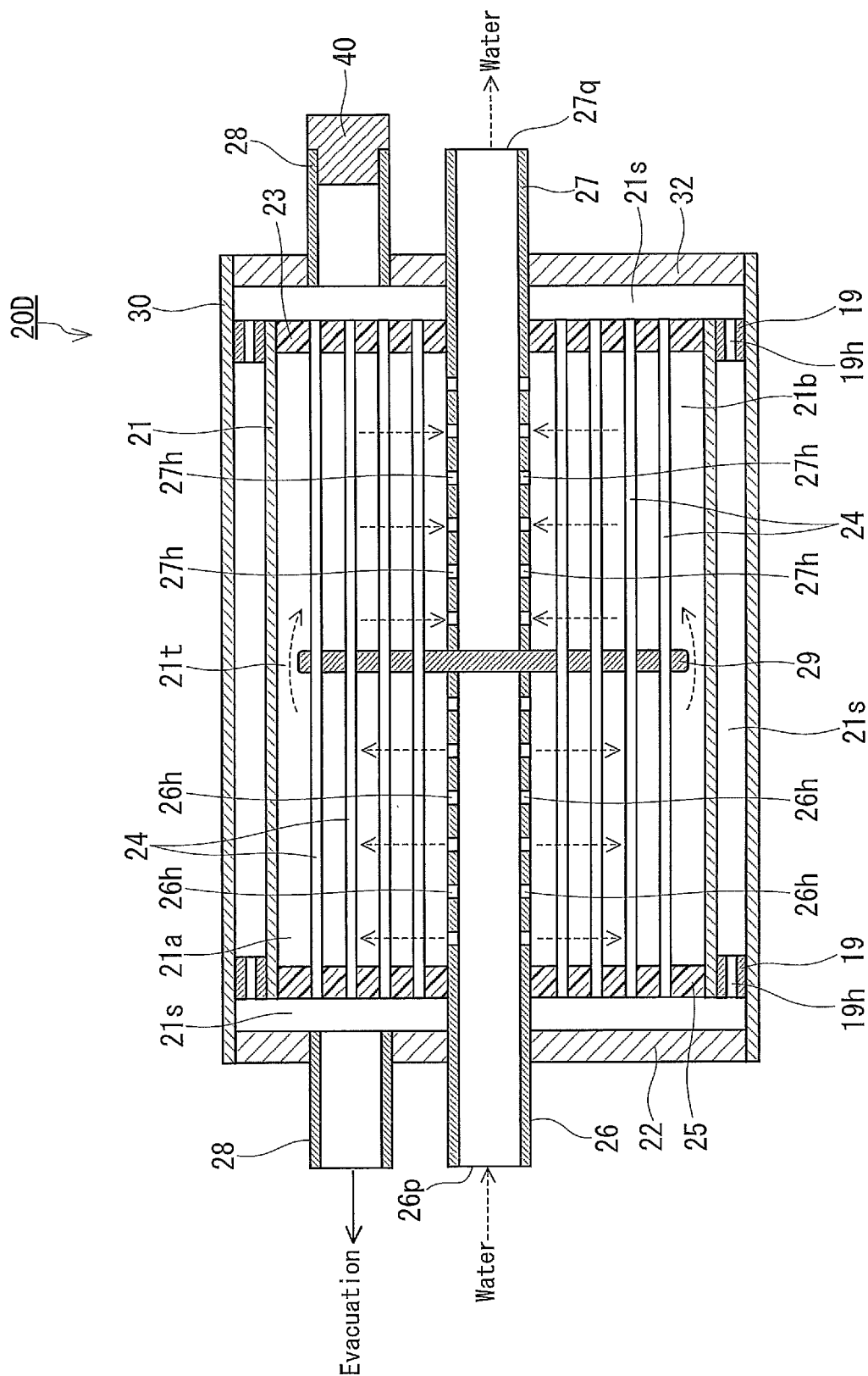
FIG. 9 is a cross-sectional view of a degassing membrane element according to Modification 5.

FIG. 9 shows a cross-section of a degassing membrane element 20D according to Modification 5. The degassing membrane element 20D shown in FIG. 9 may be included in the separation membrane modules instead of the degassing membrane element 20 shown in FIG. 2.

The degassing membrane element 20D further includes the port 28 for evacuation on the cover 32. That is, in the degassing membrane element 20D, the port 28 is provided on each of the covers 22 and 32 closing the outer shell 30. The degassing membrane element 20D of the present modification is different from the degassing membrane element 20B shown in FIG. 7 on this point. The degassing membrane element 20D of the present modification may have a bilaterally symmetric structure with respect to the longitudinal direction of the first tube 26 and the second tube 27. In this case, it is easy to manufacture and transfer the degassing membrane element 20D and to assemble a separation membrane module.

When a separation membrane module includes only one degassing membrane element 20D, only one port 28 is used. In this case, either the port 28 on the cover 22 or the port 28 on the cover 32 may be closed by the stopper 40 attached thereto.

Figure 10:
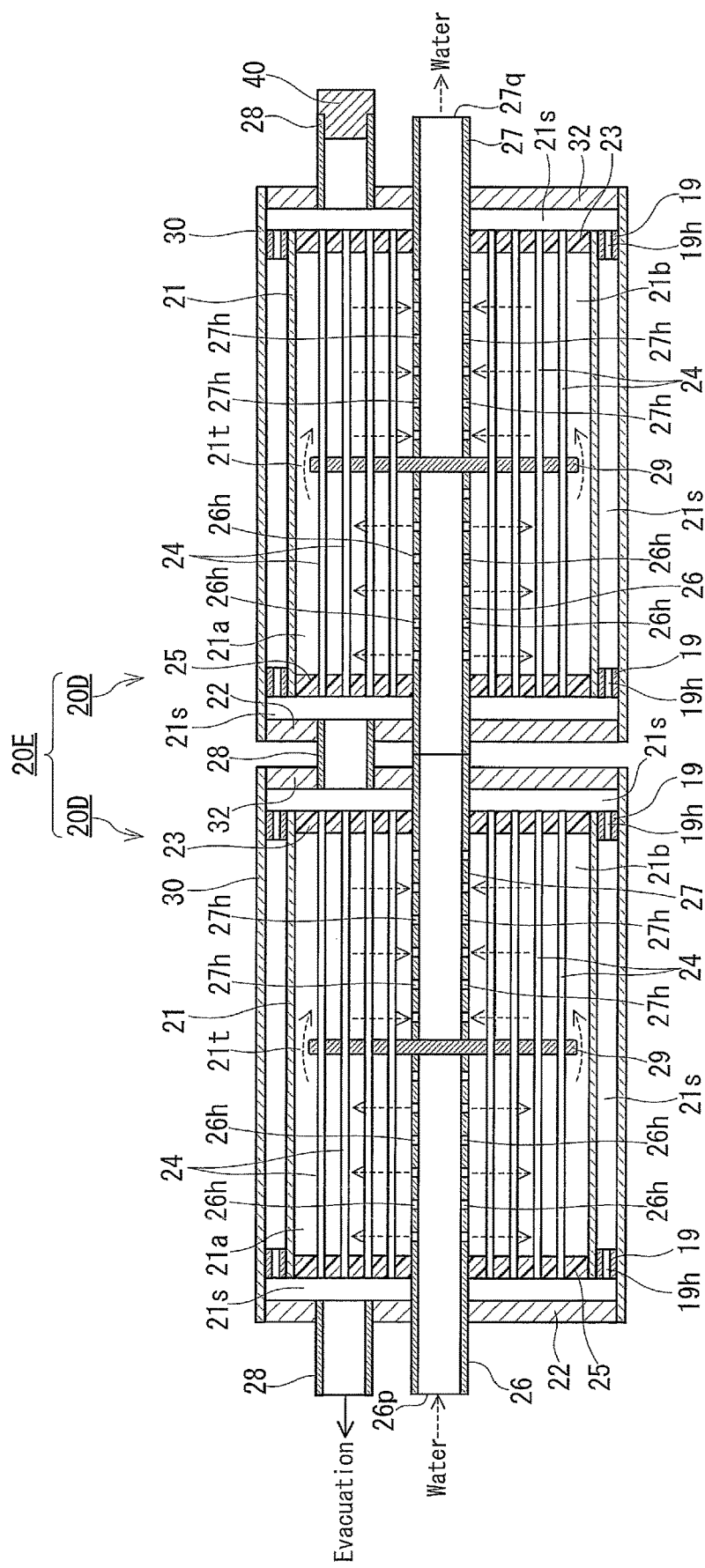
FIG. 10 is a cross-sectional view of a degassing membrane element according to Modification 6.

FIG. 10 shows a cross-section of a degassing membrane element 20E according to Modification 6. The degassing membrane element 20E shown in FIG. 10 may be included in the separation membrane modules instead of the degassing membrane element 20 shown in FIG. 2.

The degassing membrane element 20E can be produced by connecting the plurality of (e.g., two) degassing membrane elements 20D (FIG. 9) in series. The port 28 for evacuation of the degassing membrane element 20D located upstream is connected to the port 28 for evacuation of the degassing membrane element 20D located downstream.

The degassing membrane element 20C described with reference to FIG. 8 requires the outer shell 30 that is long enough to be able to accommodate the plurality of hollow fiber membrane units 50. On the other hand, the length of the outer shell 30 can be reduced with the use of the degassing membrane element 20E of the present modification. The degassing membrane element 20E can be obtained by separately producing the plurality of degassing membrane elements 20D and connecting the ports 28 thereof. Thus, the degassing membrane element 20E also is easily manufactured. Moreover, in the case of a separation membrane module including the degassing membrane element 20E of the present modification, a specific degassing membrane element 20D can be selectively replaced.

(Embodiment of Water Treatment System)

Figure 11:
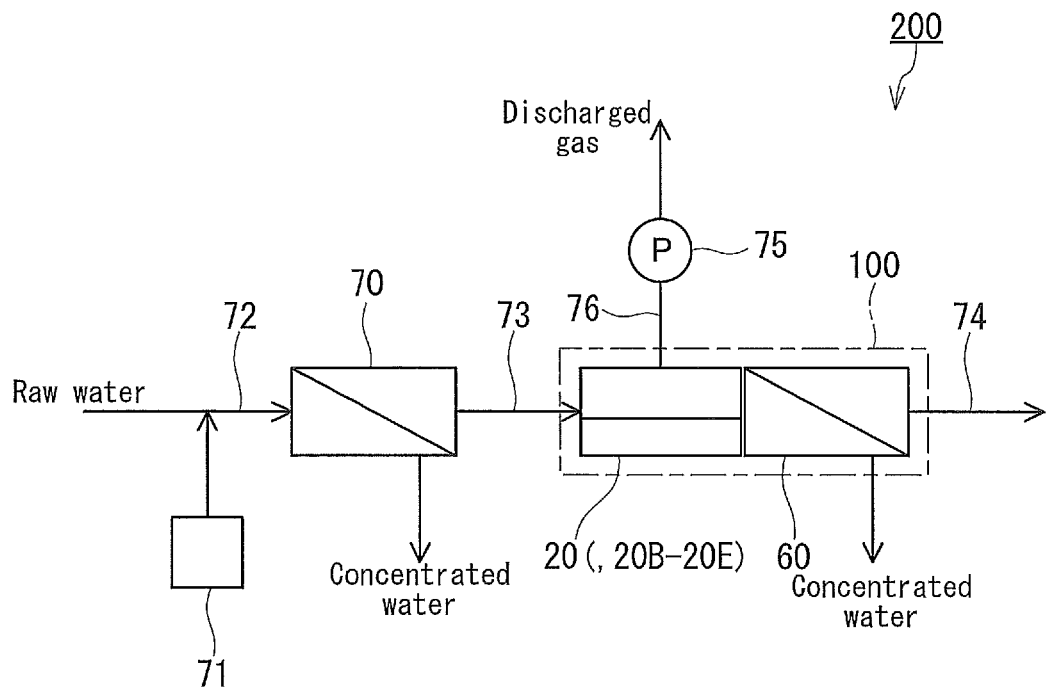
FIG. 11 is a configuration diagram of a water treatment system including the separation membrane module shown in FIG. 1.

FIG. 11 shows a configuration of a water treatment system 200 including the separation membrane module 100 shown in FIG. 1. A water treatment system 200 is, for example, a system for producing injection water supplied to oil fields and includes a first separation membrane module 70 and a second separation membrane module 100. The second separation membrane module 100 is the separation membrane module 100 described with reference to FIG. 1. The first separation membrane module 70 has at least one selected from an MF membrane and a UF membrane and filters raw water using the MF membrane and/or UF membrane. The second separation membrane module 100 is disposed downstream of the first separation membrane module 70 and treats permeated water produced in the first separation membrane module 70.

Injection water is water to be injected into oil fields and is produced from raw water such as seawater, river water, lake water, and ground water. The type of raw water is not limited to a particular one, and may be produced water obtained by drilling for crude oil. The raw water may be filtered beforehand by a filter not shown in FIG. 11 in order to remove, for example, small unwanted particles to be discarded from the raw water.

The term "oil fields" as used herein includes gas fields and gas-oil fields. The term "oil field" may refer to an offshore oil field or an onshore oil field. There are many restrictions on offshore platforms for drilling crude oil and natural gas from offshore oil fields. Various apparatuses used on offshore platforms are required, for example, to be compact, light, and highly maintainable. Therefore, the water treatment system 200 including the second separation membrane module 100 is particularly suitable for offshore oil fields. In this case, injection water is produced from seawater.

The water treatment system 200 may further include a bactericide injection device 71. The bactericide injection device 71 is a device for adding a bactericide to the raw water so that the bactericide concentration will be a predetermined value. The bactericide injection device 71 is not limited to a particular one, and is typically a metering pump for chemical injection. The bactericide injection device 71 is configured to allow the bactericide to flow into a flow path 72. The flow path 72 is, for example, a flow path connecting a raw water source (e.g., the sea) and an inlet of the first separation membrane module 70. The flow path 72 may include a tank disposed on a path from the raw water source to the first separation membrane module 70. In this case, the bactericide injection device 71 may be configured to allow the bactericide to flow into the tank. The bactericide injection device 71 adds the bactericide to the raw water to produce water containing a given concentration of the bactericide. The bactericide concentration is adjusted appropriately according to conditions such as the type of bactericide, the type of raw water, and the raw water temperature.

The type of bactericide is not limited to a particular one as long as the bactericidal effect on microorganisms that can cause biofouling is exerted. Examples of the bactericide include a chlorine bactericide. Examples of the chlorine bactericide include perchloric acid, chloric acid, chlorous acid, hypochlorous acid, and their metal salts. In the present embodiment, the bactericide includes hypochlorous acid. Hypochlorous acid is recommended because of its high bactericidal effect, inexpensiveness, and ease of access. Hypochlorous acid as the bactericide is, for example, prepared and added to the raw water in the form of an aqueous solution. As a matter of course, the bactericide may include a plurality of components.

The type of the first separation membrane module 70 is not limited to a particular one. The first separation membrane module 70 may be a hollow fiber membrane module or may be a separation membrane module including a spiral membrane element. The hollow fiber membrane module may be of an externally pressurized type or an internally pressurized type. In an externally pressurized hollow fiber membrane module, water to be treated flows outside hollow fibers while permeated water flows inside the hollow fibers. In an internally pressurized hollow fiber membrane module, water to be treated flows inside hollow fibers while permeated water flows outside the hollow fibers.

The first separation membrane module 70 produces permeated water and concentrated water. The permeated water produced in the first separation membrane module 70 is fed to the second separation membrane module 100 through a flow path 73. The flow path 73 connects a permeated water outlet of the first separation membrane module 70 and the raw water inlet of the second separation membrane module 100. The concentrated water produced in the first separation membrane module 70 may be brought back to the raw water source or may be neutralized and disposed of.

A large portion of the bactericide is not rejected by the MF membrane and/or UF membrane and permeates the first separation membrane module 70. The permeated water produced in the first separation membrane module 70 contains a sufficient amount of the bactericide. Therefore, it is unnecessary to further add the bactericide on the downstream side of the first separation membrane module 70 to reduce biofouling in the second separation membrane module 100.

Matters removed by the degassing membrane element 20 of the second separation membrane module 100 include oxygen dissolved in the water and the bactericide dissolved in the water. For example, when hypochlorous acid is used as the bactericide, the hypochlorous acid is removed from the water by the degassing membrane element 20 to decrease the concentration of the hypochlorous acid. Dissolved gases such as oxygen and carbon dioxide are also removed from the water by the degassing membrane element 20.

The degassing membrane element 20 of the second separation membrane module 100 is located upstream of the separation membrane element 60 located most downstream in the water treatment system 200. Thus, decreasing the dissolved oxygen level by means of the degassing membrane element 20 not only can reduce corrosion of an injection water pipe (a pipe for sending injection water to an oil field) but also can sufficiently reduce biofouling in the separation membrane element 60. This is because the growth rate of microorganisms causing biofouling depends on the dissolved oxygen level. Moreover, the concentration of the bactericide in the water flowing into the separation membrane element 60 is also decreased, which possibly reduces damage from the bactericide to the separation membrane included in the separation membrane element 60. The water to be treated by the first separation membrane module 70 contains the bactericide sufficiently, although the water is not yet to be treated by the degassing membrane element 20. Therefore, even when the dissolved oxygen level is high in the water, biofouling in the first separation membrane module 70 can be sufficiently reduced.

According to the present embodiment, water for a given use can be obtained by treating raw water without using the bactericide.

In the present embodiment, dissolved matters (oxygen and the bactericide) can be removed on the upstream side of the separation membrane element 60 from the water using the degassing membrane element 20. This reduces damage to the separation membrane element 60 without adding a reducing agent (such as sodium bisulfite) for removing remaining chlorine to the water or adding a neutralizer for neutralizing the water to the water. A reducing agent is not contained in the injection water produced, either. This contributes to a lower cost of producing injection water. As a matter of course, a reducing agent and/or a neutralizer may be added to the water as appropriate.

The removed matters are in a gaseous state, and is discharged to the outside through an evacuated path 76 by a vacuum pump 75.

The degassed permeated water is discharged out of the second separation membrane module 100 and fed as injection water to an oil field through a flow path 74. The flow path 74 connects the permeated water outlet of the second separation membrane module 100 and the injection water pipe. Concentrated water produced in the second separation membrane module 100 may be brought back to the raw water source or may be neutralized and disposed of.

Each of the flow paths 72, 73, and 74 is composed of at least one pipe. The flow paths 72, 73, and 74 may be provided with devices such as a pump, a valve, and a sensor, if necessary.

Figure 12:
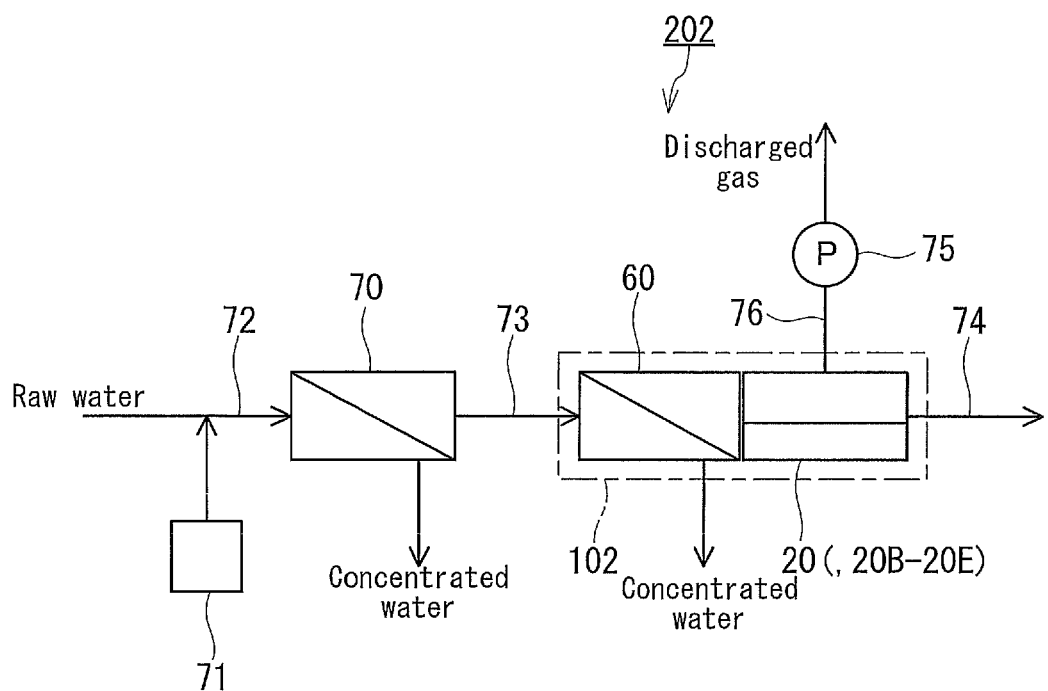
FIG. 12 is a configuration diagram of a water treatment system including the separation membrane module shown in FIG. 4.

FIG. 12 shows a configuration of a water treatment system 202 including the separation membrane module 102 shown in FIG. 4. The water treatment system 202 includes the first separation membrane module 70 and a second separation membrane module 102. The second separation membrane module 102 is the separation membrane module 102 described with reference to FIG. 4. The configuration of the water treatment system 202 shown in FIG. 12 is the same as that of the water treatment system 200 shown in FIG. 11, except for the positional relationship between the degassing membrane element 20 and the separation membrane element 60.

A system to which any of the separation membrane modules described with reference to FIGS. 1 to 10 is applied is not limited to a system for producing injection water to an oil field. The separation membrane modules of the present embodiment can be included in various water treatment systems such as water treatment systems for production of pure water (including ultrapure water), desalination of seawater, purification of wastewater, and the like.

INDUSTRIAL APPLICABILITY

The present invention is useful for systems for desalination of seawater, production of pure water, wastewater treatment, production of oil field injection water, and the like.

The invention claimed is:

1. A separation membrane module comprising:
   a container;
   a degassing membrane element that is disposed inside the container;
   a separation membrane element that is disposed inside the container, is located upstream or downstream of the degassing membrane element in a flow direction of a liquid to be treated, and filters the liquid; and
   a support disposed at a gap between the degassing membrane element and an outer wall of the container, the support having a through hole that allows the liquid to pass through the support,
   wherein both of the degassing membrane element and the separation membrane element are contained in the container.

2. The separation membrane module according to claim 1, wherein
   the container includes a cylindrical container body, a first end plate attached to a first end portion of the container body, a second end plate attached to a second end portion of the container body,
   at least one port is provided on the first end plate,
   at least one port is provided on the second end plate, and
   the at least one port provided on the first end plate or the at least one port provided on the second end plate includes a port for evacuating the degassing membrane element.

3. The separation membrane module according to claim 2, wherein the number of the at least one port provided on the first end plate is different from the number of the at least one port provided on the second end plate.

4. The separation membrane module according to claim 1, wherein
   the container has a cylindrical container body, and
   a port for communication between the inside of the container and the outside of the container is provided at each of a first end portion of the container and a second end portion of the container.

5. The separation membrane module according to claim 1, wherein the container has a bilaterally asymmetric structure with respect to the flow direction of the liquid to be treated.

6. The separation membrane module according to claim 1, wherein the separation membrane element is disposed upstream of the degassing membrane element in the flow direction of the liquid.

7. The separation membrane module according to claim 1, wherein the separation membrane element is disposed downstream of the degassing membrane element in the flow direction of the liquid.

8. The separation membrane module according to claim 1, wherein
   the degassing membrane element has a shell and a plurality of hollow fiber membranes disposed inside the shell, and
   the liquid is introduced into the shell to be brought into contact with the plurality of hollow fiber membranes and is then discharged out of the shell.

9. The separation membrane module according to claim 1, wherein the separation membrane element is an NF membrane element or an RO membrane element.

10. The separation membrane module according to claim 1, wherein
    the degassing membrane element has a shell and a second tube that extends from an inside of the shell to an outside of the shell, and
    a distributor is attached to an end portion of the second tube such that the liquid radially flows out of the second tube into an internal space of the container.

11. A liquid treatment system comprising:
    a first separation membrane module that has at least one selected from an MF membrane and a UF membrane,
    a second separation membrane module that is disposed downstream of the first separation membrane module in a direction of a liquid to be treated and treats a permeate liquid from the first separation membrane module, wherein
    the second separation membrane module is the separation membrane module according to claim 1.

* * * * *